United States Patent
McAlpine et al.

(10) Patent No.: US 8,805,144 B1
(45) Date of Patent: Aug. 12, 2014

(54) STRETCHABLE FIBER OPTIC CABLE

(71) Applicant: Corning Optical Communications LLC, Hickory, NC (US)

(72) Inventors: Warren Welborn McAlpine, Hickory, NC (US); David Alan Seddon, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/192,007

(22) Filed: Feb. 27, 2014

Related U.S. Application Data

(60) Provisional application No. 61/881,707, filed on Sep. 24, 2013.

(51) Int. Cl.
  *G02B 6/44* (2006.01)
(52) U.S. Cl.
  CPC ............ *G02B 6/4429* (2013.01); *G02B 6/4494* (2013.01); *G02B 6/443* (2013.01); *G02B 6/4432* (2013.01); *G02B 6/4433* (2013.01)
  USPC ....................................................... 385/113
(58) Field of Classification Search
  CPC .... G02B 6/443; G02B 6/4429; G02B 6/4432; G02B 6/4433; G02B 6/4494
  USPC ......................................................... 385/113
  See application file for complete search history.

(56) References Cited

U.S. PATENT DOCUMENTS

| | | | |
|---|---|---|---|
| 4,496,214 A | 1/1985 | Oestreich et al. | 350/96.23 |
| 4,515,435 A | 5/1985 | Anderson | 350/96.23 |
| 4,535,098 A | 8/1985 | Evani et al. | 521/149 |
| 4,730,894 A | 3/1988 | Arroyo | 350/96.23 |
| 4,767,184 A | 8/1988 | Ogasawara et al. | 350/96.23 |
| 4,796,970 A | 1/1989 | Reeve et al. | 385/109 |
| 4,930,860 A | 6/1990 | Tansey et al. | 350/96.23 |
| 4,973,611 A | 11/1990 | Puder | 522/42 |
| 4,993,804 A | 2/1991 | Mayr et al. | 350/96.23 |
| 5,155,789 A | 10/1992 | Le Noane et al. | 385/106 |
| 5,157,752 A | 10/1992 | Greveling et al. | 385/112 |

(Continued)

FOREIGN PATENT DOCUMENTS

| | | | | |
|---|---|---|---|---|
| CN | 102023357 B | 11/2012 | | G02B 6/44 |
| EP | 1531352 B1 | 12/2009 | | G02B 6/44 |

(Continued)

OTHER PUBLICATIONS

Patent Cooperation Treaty Annex to Form PCT/ISA/206, Communication Relating to the Results of the Partial International Search, Application No. PCT/US2013/061133, Jan. 8, 2014, 3 pages.

(Continued)

*Primary Examiner* — Ryan Lepisto
*Assistant Examiner* — Jerry Blevins
(74) *Attorney, Agent, or Firm* — Russell S. Magaziner

(57) ABSTRACT

A fiber optic cable includes a strength member, tubes coupled to the strength member, and optical fibers. The strength member provides tensile and anti-buckling strength. The tubes have a cavity into which the optical fibers are packed. The cable is stretchable in that the optical fibers experience less than 0.5 dB/km of increased average attenuation at 1310 nanometers wavelength when the cable experiences strain of up to $2\times10^{-3}$.

18 Claims, 1 Drawing Sheet

(56) References Cited

U.S. PATENT DOCUMENTS

| | | | | |
|---|---|---|---|---|
| 5,173,961 | A | 12/1992 | Chiasson | 385/113 |
| 5,179,611 | A | 1/1993 | Umeda et al. | 385/110 |
| 5,233,678 | A | 8/1993 | Katurashima et al. | 385/112 |
| 5,388,175 | A | 2/1995 | Clarke | 385/100 |
| 5,440,660 | A | 8/1995 | Dombrowski et al. | 385/102 |
| 5,671,312 | A | 9/1997 | Jamet | 385/100 |
| 5,684,904 | A | 11/1997 | Bringuier et al. | 385/109 |
| 5,703,983 | A | 12/1997 | Beasley, Jr. | 385/104 |
| 6,137,936 | A | 10/2000 | Fitz et al. | 385/113 |
| 6,185,352 | B1 | 2/2001 | Hurley | 385/114 |
| 6,193,824 | B1 | 2/2001 | Einsle et al. | 156/53 |
| 6,215,931 | B1 | 4/2001 | Risch et al. | 385/109 |
| 6,304,701 | B1 | 10/2001 | Bringuier et al. | 385/106 |
| 6,318,061 | B1 | 11/2001 | Schneider et al. | 57/7 |
| 6,334,015 | B2 | 12/2001 | Jamet | 385/102 |
| 6,483,971 | B2 | 11/2002 | Gaillard et al. | 385/113 |
| 6,487,346 | B2 | 11/2002 | Nothofer | 385/109 |
| 6,546,712 | B2 | 4/2003 | Moss et al. | 57/293 |
| 6,597,844 | B1 | 7/2003 | Witt et al. | 385/109 |
| 6,603,908 | B2 | 8/2003 | Dallas et al. | 385/109 |
| 6,658,184 | B2 | 12/2003 | Bourget et al. | 385/100 |
| 6,721,480 | B1 | 4/2004 | Bocanegra et al. | 385/114 |
| 6,760,523 | B2 | 7/2004 | V. Nechitailo | 385/112 |
| 6,798,958 | B2 | 9/2004 | Bourget et al. | 385/113 |
| 6,849,333 | B2 * | 2/2005 | Schissel et al. | 428/392 |
| 6,856,748 | B1 | 2/2005 | Elkins, II et al. | 385/135 |
| 6,870,995 | B2 | 3/2005 | Johnson et al. | 385/112 |
| 6,901,191 | B2 | 5/2005 | Hurley et al. | 385/109 |
| 6,912,347 | B2 | 6/2005 | Rossi et al. | 385/112 |
| 6,931,190 | B2 | 8/2005 | Ino et al. | 385/128 |
| 6,937,802 | B2 | 8/2005 | Jamet et al. | 385/106 |
| 6,957,000 | B2 | 10/2005 | McAlpine et al. | 385/102 |
| 6,973,246 | B2 | 12/2005 | Bocanegra et al. | 385/113 |
| 7,082,241 | B2 | 7/2006 | Jamet et al. | 385/100 |
| 7,123,801 | B2 | 10/2006 | Fitz | 385/105 |
| 7,200,307 | B2 | 4/2007 | Bau' et al. | 385/111 |
| 7,212,715 | B2 | 5/2007 | Dallas et al. | 385/100 |
| 7,242,830 | B2 | 7/2007 | Storaasli et al. | 385/100 |
| 7,242,831 | B2 | 7/2007 | Fee | 385/103 |
| 7,277,615 | B2 | 10/2007 | Greenwood et al. | 385/100 |
| 7,321,709 | B2 | 1/2008 | Yokokawa et al. | 385/103 |
| 7,341,965 | B2 * | 3/2008 | Schreder et al. | 501/37 |
| 7,359,600 | B2 | 4/2008 | Kim et al. | 385/113 |
| 7,373,057 | B2 | 5/2008 | Pizzorno et al. | 385/109 |
| 7,391,943 | B2 | 6/2008 | Blazer et al. | 385/100 |
| 7,431,963 | B2 | 10/2008 | Konstadinidis et al. | 427/163.2 |
| 7,567,741 | B2 | 7/2009 | Abernathy et al. | 385/113 |
| 7,570,852 | B2 | 8/2009 | Nothofer et al. | 385/100 |
| 7,570,854 | B2 | 8/2009 | Keller et al. | 385/110 |
| 7,630,605 | B2 | 12/2009 | Bringuier et al. | 385/100 |
| 7,742,667 | B2 | 6/2010 | Paschal et al. | 385/109 |
| 7,750,060 | B2 | 7/2010 | Zahora et al. | 522/97 |
| 7,970,247 | B2 | 6/2011 | Barker | 385/100 |
| 7,974,507 | B2 | 7/2011 | Lovie et al. | 385/113 |
| 7,995,886 | B2 | 8/2011 | Pizzorno et al. | 385/109 |
| 8,031,997 | B2 | 10/2011 | Overton | 385/110 |
| 8,041,167 | B2 | 10/2011 | Overton | 385/109 |
| 8,118,282 | B2 | 2/2012 | Griffioen et al. | 254/134.4 |
| 8,150,226 | B2 | 4/2012 | Casals et al. | 385/100 |
| 8,165,439 | B2 | 4/2012 | Overton | 385/106 |
| 8,175,434 | B2 | 5/2012 | Davidson et al. | 385/113 |
| 8,180,190 | B2 | 5/2012 | Bringuier et al. | 385/109 |
| 8,189,974 | B2 | 5/2012 | Hashimoto et al. | 385/109 |
| 8,355,613 | B2 | 1/2013 | Weimann | 385/100 |
| 8,467,645 | B2 | 6/2013 | Keller et al. | 385/104 |
| 8,467,650 | B2 | 6/2013 | Overton et al. | 385/128 |
| 8,494,327 | B2 | 7/2013 | Keller et al. | 385/106 |
| 8,498,509 | B2 | 7/2013 | Tatat | 385/100 |
| 8,620,124 | B1 | 12/2013 | Blazer et al. | 385/102 |
| 2002/0122640 | A1 * | 9/2002 | Strong et al. | 385/114 |
| 2003/0035635 | A1 | 2/2003 | Chastain et al. | 385/112 |
| 2003/0165310 | A1 | 9/2003 | Moon et al. | 385/113 |
| 2004/0240806 | A1 | 12/2004 | Lail et al. | 385/100 |
| 2004/0252954 | A1 | 12/2004 | Ginocchio et al. | 385/100 |
| 2006/0045443 | A1 | 3/2006 | Blazer | 385/114 |
| 2006/0093268 | A1 | 5/2006 | Zimmel | 385/50 |
| 2007/0140631 | A1 * | 6/2007 | Pizzorno et al. | 385/112 |
| 2008/0273845 | A1 | 11/2008 | Weimann | 385/103 |
| 2009/0116797 | A1 | 5/2009 | Stingl et al. | 385/103 |
| 2009/0214167 | A1 | 8/2009 | Lookadoo et al. | 385/100 |
| 2009/0297104 | A1 | 12/2009 | Kachmar | 385/101 |
| 2009/0317039 | A1 | 12/2009 | Blazer et al. | 385/107 |
| 2010/0067856 | A1 | 3/2010 | Knoch et al. | 385/111 |
| 2010/0119202 | A1 | 5/2010 | Overton | 385/141 |
| 2010/0150505 | A1 | 6/2010 | Testu et al. | 385/109 |
| 2010/0189399 | A1 | 7/2010 | Sillard et al. | 385/126 |
| 2010/0202741 | A1 | 8/2010 | Ryan et al. | 385/113 |
| 2011/0091171 | A1 | 4/2011 | Tatat et al. | 385/105 |
| 2011/0110635 | A1 | 5/2011 | Toge et al. | 385/102 |
| 2011/0135816 | A1 | 6/2011 | Burns et al. | 427/163.2 |
| 2011/0194825 | A1 | 8/2011 | Parris | 385/109 |
| 2011/0268398 | A1 | 11/2011 | Quinn et al. | 385/100 |
| 2012/0063731 | A1 | 3/2012 | Fitz et al. | 385/104 |
| 2012/0099825 | A1 | 4/2012 | Messer | 385/113 |
| 2012/0257864 | A1 | 10/2012 | Consonni et al. | 385/112 |
| 2012/0281953 | A1 | 11/2012 | Choi et al. | 385/101 |
| 2013/0058614 | A1 | 3/2013 | Gimblet et al. | 385/104 |

FOREIGN PATENT DOCUMENTS

| | | | | |
|---|---|---|---|---|
| EP | 1610163 | B1 | 10/2011 | G02B 6/44 |
| EP | 1982222 | B1 | 6/2012 | G02B 6/44 |
| GB | 2064163 | A | 6/1981 | G02B 5/14 |
| GB | 2096343 | A | 10/1982 | G02B 5/14 |
| JP | 3137607 | | 11/2007 | A61B 6/00 |
| JP | 2010-39018 | | 2/2010 | G02B 6/44 |
| KR | 10-0288444 | | 5/2001 | G02B 6/44 |
| KR | 2001-0045604 | | 6/2001 | G02B 6/44 |
| KR | 10-1140219 | B1 | 5/2012 | G02B 6/44 |
| WO | WO01/21706 | A1 | 3/2001 | C08L 23/06 |
| WO | WO 02/099491 | A1 | 12/2002 | G02B 6/44 |
| WO | WO2006/034722 | A1 | 4/2006 | G02B 6/44 |
| WO | WO2011/137236 | A1 | 11/2011 | B29C 47/02 |
| WO | WO2012/071490 | A2 | 5/2012 | B29C 47/02 |
| WO | WO2012/071490 | A3 | 5/2012 | B29C 47/02 |
| WO | WO2013/130121 | A1 | 9/2013 | G02B 6/44 |
| WO | WO2013/172878 | A1 | 11/2013 | G02B 6/44 |

OTHER PUBLICATIONS

Hogari et al., Feb. 1998, "Optical Fiber Cables for Residential and Business Premises," *Journal of Lightwave Technology*, vol. 16, No. 2, pp. 207-213.

Marelli et al., Nov. 11-14, 2007, "Indoor Cables for FTTH Applications, Allowing Quick and Simple Subscriber Connection," 56th IWCS Conference: Proceedings of the International Wire & Cable Symposium (IWCS), Inc., pp. 121-127.

Prysmian Cables & Systems, Oct. 5, 2005, "Glossary Excerpt from Prysmian's Wire and Cable Engineering Guide," Revision 3, pp. 1-40, Retrieved from www.prysmian.com.

Marik, J., "Advanced SZ Stranding Technology for Enhanced Applications," 4 pages, Last accessed on Feb. 21, 2014 from http://rosendahlaustria.com/custom/rosendahlaustria/Rosendahl_Products_PDF/1062003111324_pl_.pdf.

Nextrom, "SZ Stranding Line OFC 70," 2 pages, Last accessed on Feb. 21, 2014 from http://www.nextrom.com/877_en_SZ-Stranding-Line.aspx.

Rechberger, M., Hörschläger, W., "Buffering & SZ-Stranding Process for Compact Dry Tube FO-Cable," *Proceedings of the 56th Annual International Wire & Cable Symposium*, 2007,—pp. 614-617, Last accessed on Feb. 24, 2014 from http://ecadigitallibrary.com/pdf/IWCS07/15_5.pdf.

USPTO, Non-Final Rejection for U.S. Appl. No. 13/790,329, Mailing Date Aug. 16, 2013—12 pages.

Non-Final Rejection Response for U.S. Appl. No. 13/790,329, Mailing Date Oct. 11, 2013—20 pages.

USPTO, Notice of Allowance for U.S. Appl. No. 13/790,329, Mailing Date Nov. 12, 2013—8 pages.

(56) References Cited

OTHER PUBLICATIONS

U.S. Appl. No. 13/790,329, filed Mar. 8, 2013, Bradley J. Blazer, 48 pages.
U.S. Appl. No. 14/099,921, filed Dec. 7, 2013, Mario Sergio Sandate Aguilar, 35 pages.
U.S. Appl. No. 14/231,875, filed Apr. 1, 2014, Michael Emmerich, 38 pages.
U.S. Appl. No. 61/892,534, filed Oct. 18, 2013, Bradley J. Blazer, 42 pages.
U.S. Appl. No. 14/136,311, filed Dec. 20, 2013, Anne G. Bringuier, 22 pages.
U.S. Appl. No. 61/921,769, filed Dec. 30, 2013, Anne G. Bringuier, 30 pages.
U.S. Appl. No. 61/921,777, filed Dec. 30, 2013, Warren W. McAlpine, 56 pages.
U.S. Appl. No. 61/921,755, filed Dec. 30, 2013, David Wesley Chiasson, 42 pages.
U.S. Appl. No. 61/921,763, filed Dec. 30, 2013, William Carl Hurley, 45 pages.

\* cited by examiner

STRETCHABLE FIBER OPTIC CABLE

RELATED APPLICATIONS

This Application claims the benefit of U.S. Provisional Application No. 61/881,707, filed Sep. 24, 2013, which is incorporated by reference herein in its entirety.

BACKGROUND

Aspects of the present disclosure relate generally to fiber optic cables.

Stretching or straining of optical fibers may increase attenuation of signals communicated via the optical fibers. Accordingly, fiber optic cables may be designed with strength components to minimize stretching of the cable and correspondingly minimize stretching of the optical fibers.

In some fiber optic cable designs, the optical fibers may be loosely arranged in tubes in the fiber optic cables called buffer tubes. The buffer tubes generally have free space that allows the optical fibers to have excess optical fiber length relative to the length of the respective buffer tubes. As the buffer tubes stretch, the optical fibers straighten within the buffer tubes, but are not strained until all of the excess optical fiber length in the optical fibers is removed, providing a "strain window."

Applicants have found that excess optical fiber length may vary at least in part due to the process of manufacturing the buffer tubes. The variation may be with respect to individual optical fibers within a buffer tube as well as between optical fibers of different buffer tubes in the same cable. Further, Applicants have found that the degree of excess optical fiber length may additionally be modified by time, temperature, and subsequent processing of the buffer tubes during the manufacturing of the corresponding fiber optic cable, both in winding the buffer tubes around a central strength member, called "stranding," and when applying a protective jacket around the stranded buffer tubes, called "jacketing."

Strength components of fiber optic cables are typically selected to accommodate the lower end of the range of excess optical fiber lengths. Put another way, the strength components are be sized and configured to prevent straining and attenuation of the optical fibers of the cable that have the least amount of excess optical fiber length. Such magnitude of strength may be unnecessary for optical fibers of the cable having a greater amount of excess optical fiber length.

SUMMARY

One embodiment relates to a fiber optic cable that includes a strength member, tubes coupled to the strength member, and optical fibers. The strength member provide tensile and anti-buckling strength. The tubes have a cavity into which the optical fibers are packed. The optical fibers are relatively highly contorted in the tubes such that the average length of the optical fibers for a 10 meter long section of the cable is at least 25 millimeters greater than the average length of the tubes in that section. Further, the optical fibers are relatively evenly contorted in the tubes such that for the 10 meter long section of the cable the optical fibers differ from the average length of the optical fibers of that section by less than 5 millimeters. The optical fibers experience less than 0.5 dB/km of increased average attenuation at 1310 nanometers wavelength when the cable experiences strain of up to $2 \times 10^{-3}$. The cable may use a binder sleeve to provide an even distribution of radially inward force to constrain the tubes.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the Figures, which illustrate exemplary embodiments in detail, it should be understood that the present inventive and innovative technology is not limited to the details or methodology set forth in the Detailed Description or illustrated in the Figures. For example, as will be understood by those of ordinary skill in the art, features and attributes associated with embodiments shown in one of the Figures may be applied to embodiments shown in others of the Figures.

Figure 1:
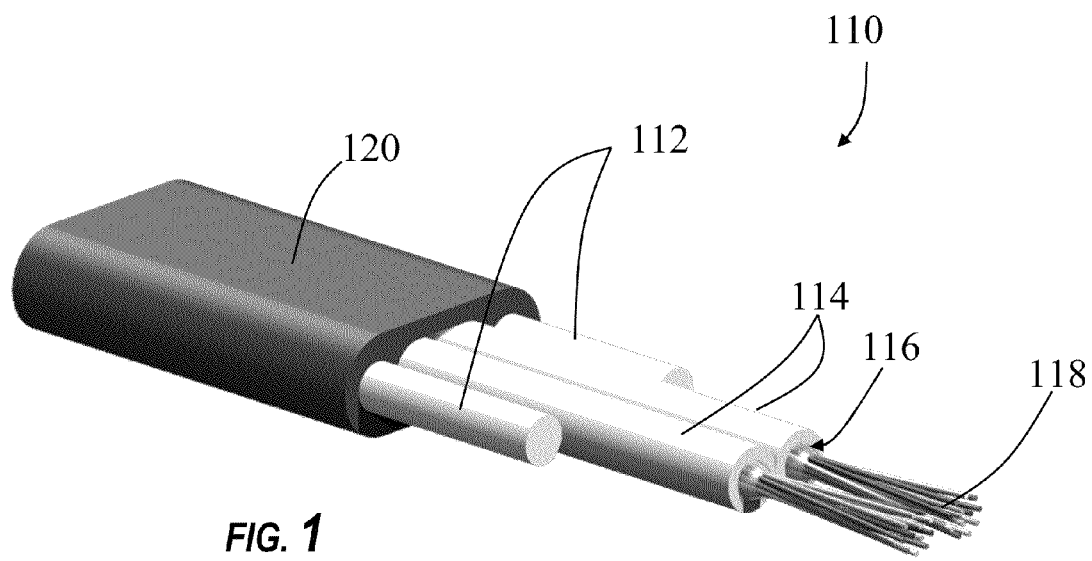
FIG. 1 is a perspective view of a fiber optic cable according to an exemplary embodiment.

Referring to FIG. 1, a fiber optic cable 110 includes strength members 112 and buffer tubes 114 coupled to the strength members 112 such that the strength members 112 provide reinforcement to the buffer tubes 114. The buffer tubes 114 each have a cavity 116 and the fiber optic cable 110 further includes optical fibers 118 packed into the cavity 116 such that the optical fibers 118 bend therein, meaning that the optical fibers 118 may twist, undulate, spiral, or otherwise contort in the cavity 116. As such, the optical fibers 118 have a greater length than the length of the buffer tube 114 containing the respective optical fibers 118. The cable 110 includes a jacket 120 surrounding and coupling the strength members 112 and buffer tubes 114.

Figure 2:
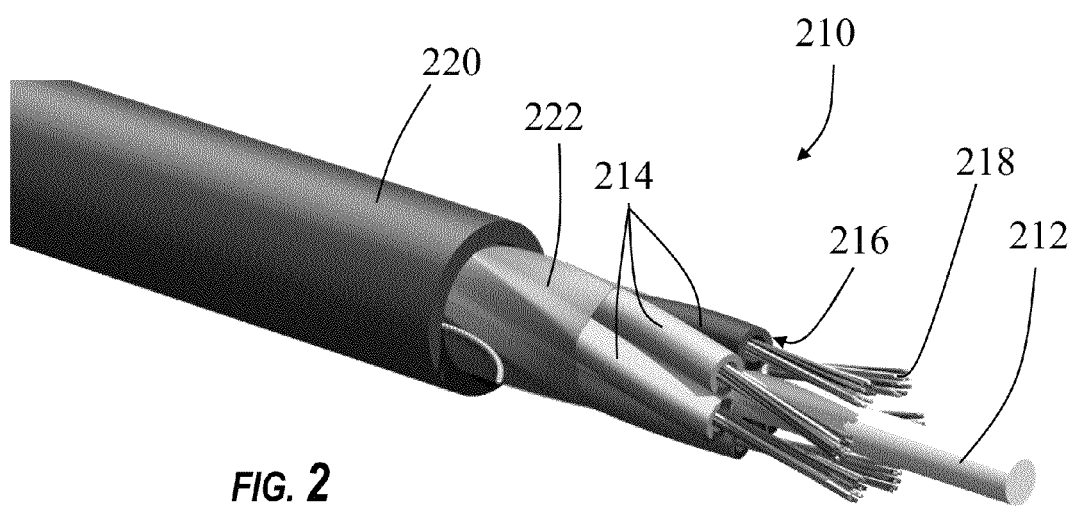
FIG. 2 is a perspective view of a fiber optic cable according to another exemplary embodiment.

Referring now to FIG. 2, a fiber optic cable 210 includes a centrally-located strength member 212 and buffer tubes 214 coupled to the strength member 212 such that the strength member 212 provides reinforcement to the buffer tubes 214. The buffer tubes 214 each have a cavity 216 and the fiber optic cable 210 further includes optical fibers 218 packed into the cavity 216 such that the optical fibers 218 bend therein. The cable 210 includes a jacket 220 surrounding the strength member 212 and buffer tubes 214. Additionally, in FIG. 2, the buffer tubes 214 are wound around the strength member 212 and held in place by a binder sleeve 222.

According to an exemplary embodiment, the strength members 112, 212 are configured to provide tensile strength as well as anti-buckling strength in cold temperatures to the fiber optic cable 110, 210. In some embodiments there are two strength members 112, as shown in FIG. 1, with the strength members 112 on either side of the buffer tubes 114. In other embodiments, there are more than two strength members, such as pairs of strength members on either side of buffer tubes. In still other embodiments, as shown in FIG. 2, there may be only one such strength member 212.

The strength members 112, 212 may include glass-reinforced plastic (GRP), steel, resin bonded aramid, or other suitable strength material. In some embodiments, the strength members 112, 212 may provide sufficient tensile strength for the fiber optic cable 110, 210 while the amount of strength components may be reduced relative to other cables such that the present fiber optic cable 110, 210 may be free of aramid yarn, free of fiberglass yarn, and/or other tensile strength yarns, thereby reducing the overall size of the fiber optic cable 110, 210 and increasing the stretch-ability of the overall cable 110, 210.

According to an exemplary embodiment, the buffer tubes 114, 214 and strength members 112, 212 are surrounded by the jacket 120, 220. The jacket 120, 220 may directly contact the buffer tubes 114, 214 and/or the strength members 112, such as where the strength members 112 and/or buffer tubes 114 are fully surrounded and embedded in the jacket 120. In other embodiments, the jacket 120, 220 may be separated from the strength members 112, 212 and/or the buffer tubes 114, 214, such as by layers of intermediate materials, such as metal armor, water-swellable tape, fire-retardant tape, or other materials.

In some embodiments, the jacket 120, 220 includes, such as primarily includes, polyethylene. In other embodiments, the jacket 120, 220 includes polyvinyl chloride or other polymers. The jacket 120, 220 may further include fillers and/or additives, such as bonding agents and fire-retardant fillers. In some embodiments, the jacket 120, 220 may form the outermost surface of the cable 110, 210, while in other embodiments the jacket 120, 220 may not, such as when a cable includes an exterior skin layer and/or is part of a larger "break-out"—or distribution-type cable.

The buffer tubes 114, 214 may include polypropylene, polyvinyl chloride, polycarbonate, polybutylene terephthalate, and/or other polymers. Fillers, additives, and other components may be added to the polymers. Referring specifically to FIG. 1, one, two, or more buffer tubes 114 may be aligned longitudinally in the same general plane and between the strength members 112. The planar alignment may provide a bend preference to the cable 110, and the jacket 120 may have relatively flat sides.

In some embodiments, in addition to the optical fibers 118, 218, the buffer tubes 114, 214 are filled with a filling compound, such as a grease or petroleum-based gel. The filling compound water-blocks the buffer tubes 114, 214 and provides coupling between the optical fibers and the buffer tubes 114, 214. In other embodiments, the buffer tubes 114, 214 are "dry" and are free of filling compound. In such embodiments, the buffer tubes 114, 214 may be water-blocked by water-swellable powder, such as super-absorbent polymer, which may be impregnated in a yarn extending through the cavity 116, 216 of the buffer tubes 114, 214 and/or the powder may be mechanically attached to the interior of the buffer tube 114, 214.

According to an exemplary embodiment, the buffer tubes 114, 214 have an outer diameter that is 3 millimeters or less, such as 2.5 millimeters or less, or even 2 millimeters or less. The buffer tubes 114, 214 may have an average wall thickness of at least 100 micrometers, such as at least 200 micrometers, and/or less than a millimeter. As the number of optical fibers 118, 218 increases for the same size buffer tube 114, 214, the freedom of the optical fibers 118, 218 therein to bend and have excess optical fiber length decreases. Each buffer tube 114, 214 may include at least one optical fiber 118, 218, such as at least four optical fibers 118, 218, such as at least twelve optical fibers 118, 218. Dummy rods may replace one or more of the buffer tubes 114, 214 for the cable 110, 210, if fewer buffer tubes 114, 214 are desired for a particular cable design.

According to an exemplary embodiment, the optical fibers 118, 218 include a glass core immediately surrounded by a glass cladding, which is immediately surrounded by one or more layers of a polymer coating, such as softer, stress-isolation layer of acrylate immediately surrounded by a harder shell of acrylate. According to an exemplary embodiment, the optical fibers 118, 218 are individual, discrete optical fibers, as opposed to optical fibers of a fiber optic ribbon. The optical fibers 118, 218 may be single mode optical fibers, multi-mode optical fibers, multi-core optical fibers, plastic optical fibers, optical fibers having a uniform cladding, and/or other types of optical fibers.

The optical fibers 118, 218 may be bend-resistant optical fibers having a cladding that includes annular layers of differing refractive indices or other types of bend-resistant optical fibers. An example of a bend-insensitive, or bend resistant, optical fiber is ClearCurve® Multimode fiber commercially available from Corning Incorporated of Corning, N.Y. In some such embodiments, when bent into a coil having a single turn with a diameter of about 200 millimeters, the optical fibers 118, 218 of the cable 110, 210 have a change in optical attenuation (delta attenuation) at 1310 nanometers of about 0.1 dB or less per turn, and more preferably about 0.03 dB or less per turn, where the above delta attenuation is observed at one or more wavelengths preferably greater than or equal to 1500 nm, in some embodiments also greater than about 1310 nm, in other embodiments also greater than 1260 nm. Use of bend-resistive optical fibers may facilitate improved optical performance of the cable 110, 210 when the cable 110, 210 is stretched.

According to an exemplary embodiment, the optical fibers 118, 218 are packed into the cavity 116, 216 of each buffer tube 114, 214 such that the optical fibers 118, 218 bend therein. In some embodiments, the optical fibers 118, 218 are relatively highly contorted or bent in the tubes 114, 214 when compared to conventional fiber optic cables. For example, the optical fibers 118, 218 may have an average length for a 10 meter long section of the cable 110, 210 that is at least 25 millimeters greater than the average length of the corresponding buffer tubes 114, 214 in that section in which the optical fibers 118, 218 are positioned, such as at least 30 millimeters greater on average, such as at least 35 millimeters greater on average, where such structure may be present under standard conditions, such as at room temperature (27° C.) with the cable 110, 210 laying in a straight path on a flat surface.

Furthermore, in some embodiments, the optical fibers 118, 218 are relatively evenly contorted or bent in the buffer tubes 114, 214 such that all the optical fibers 118, 218 of the particular buffer tube 114, 214 and/or of the entire cable 110, 210 have almost the exact same length as one another. For example, the optical fibers 118, 218 for the 10 meter long section of the cable 110, 210 may have individual lengths that differ from the average length of the optical fibers 118, 218 of that section or particular buffer tube 114, 214 by less than 5 millimeters, such as less than 4 millimeters, or even less than about 3 millimeters. In some embodiments, the difference in length may be up to 10 millimeters, where such structure may be present under standard conditions, such as at room temperature (27° C.) with the cable 110, 210 laying in a straight path on a flat surface.

The uniformity and high degree of excess optical fiber length allows the cable 110, 210 to stretch while providing a large strain window for the optical fibers 118, 218. For example, in some such cables 110, 210, the optical fibers 118, 218 experience less than 0.5 dB/km of increased average attenuation at 1310 nanometers wavelength when the cable 110, 210 experiences strain of up to $2 \times 10^{-3}$, such as strain up to $2.5 \times 10^{-3}$, or even up to $3 \times 10^{-3}$. Further, the strength components may be selected to allow the cable 110, 210 to strain more than conventional cables due to the increased strain window, which may reduce the overall size of the fiber optic cable 110, 210, saving material resources and reducing the volume of space in ducts and passageways occupied by the cable 110, 210, among other benefits.

For example, the cable 110, 210 may be configured to strain at least 1%, such as at least 1.1% or even 1.2%, without substantial increase in attenuation of the optical fibers 118, 218, such that the optical fibers 118, 218 experience less than 0.25 dB/km of average increased attenuation at 1310 nanometers wavelength when the cable 110, 210 is under such strain. In one embodiment, the cable 110, 210 may have a nominal excess optical fiber length of at least 0.25% (±0.025% or less), a cable strain under 600 lbf of at least about 1.1%, and/or a low temperature performance of −40° C. or lower. In another embodiment, the cable 110, 210 may have a nominal excess optical fiber length of at least 0.35% (±0.025% or less), a cable strain under 600 lbf of at least about 1.2%, and/or a low temperature performance of −20° C. or lower. Use of bend-resistant optical fiber 118, 218 may help lower the low temperature limits of the cable 110, 210. An upper bound of excess optical fiber length may be 1% for cables 110, 210 disclosed herein.

The amount of excess optical fiber length in the optical fibers 118, 218 of buffer tubes 114, 214 may be controlled via a variety of processes, materials, and structures. In some embodiments, the buffer tubes 114, 214 are manufactured with materials having a high, yet consistent degree of shrink-back, such as types of polypropylene, where the "shrink-back" is the contraction in length of the buffer tubes 114, 214 following extrusion, as the tubes 114, 214 cool and solidify. If the tubes 114, 214 are cooled in an unconstrained location, such as loosely coiled in a pan, the buffer tubes 114, 214 may be allowed to freely contract while the optical fibers 118, 218 therein may remain the same length and correspondingly bend within the buffer tubes to a relatively high degree. Further, if the material is particularly consistent in the degree of shrink-back, the statistical distribution (i.e., spread) of excess optical fiber length may be particularly tight. Slowing the processing speed of buffer tube manufacturing may reduce formation of irregularities in the buffer tube 114, 214, which may otherwise lead to differences in shrink-back and corresponding increased spread of excess optical fiber lengths. Alternatively or in addition thereto, tension may be applied to the strength members 112, 212, buffer tubes 114, 214, and/or optical fibers 118, 218 during the stranding and jacketing processes to remove excess optical fiber length and/or provide controlled excess optical fiber length to the buffer tubes 114, 214. An example of such a manufacturing process is provided in U.S. Pat. No. 7,277,615, which is incorporated by reference herein in its entirety.

Referring now specifically to FIG. 2, the binder sleeve 222 may be used to constrain the buffer tubes 214, such as if the buffer tubes 214 are wound around the central strength member 212 in a pattern of reverse-oscillatory winding (e.g., "SZ stranding") where the buffer tubes 214 spiral one way and then reverse, and reverse again, and so forth. In some embodiments, the average distance between reversals in the direction of the spiraling is at least 10 centimeters along the length of the cable 210 and is less than 5 meters along the length of the cable 210. In such a pattern, the buffer tubes 214 may have stored torsion motivating separation between the buffer tubes 214 and the central strength member 212, particularly at the reversals in the winding direction, that, if left unconstrained, may otherwise lead to a "bird cage" effect during the jacketing process, where the cable 210 has bulges due to the buffer tubes 214 having pulled away from the central strength member 212 that have been jacketed to form what may appear to be a "bird cage."

According to an exemplary embodiment, the binder sleeve 222 differs from many conventional binders, such as binder yarns or tapes, in that the binder sleeve 222 provides a relatively uniform distributed load along the buffer tubes 214 to hold the buffer tubes 214 to the central strength member 212. The binder sleeve 222 is continuous lengthwise and peripherally around the core (tubes 214 and strength member 212) of the cable 210, such as forming a closed loop for a length of at least 10 meters along the cable. Such a binder sleeve 222 may be particularly advantageous for cables 210 disclosed herein because the binder sleeve may mitigate localized stressing of the buffer tube 214 associated with conventional binder yarns or tapes, which provide localized stresses as the binder yarns or tapes tighten around the underlying buffer tubes when the cable stretches, causing increased attenuation of the optical fibers contained therein. In at least some other contemplated embodiments, conventional binders may be used.

According to an exemplary embodiment, the binder sleeve 222 is extruded around the buffer tubes 218 during the stranding process. For example, the binder sleeve 222 may be extruded onto the stranded buffer tubes 214 almost immediately following the stranding. Further, a constraining device, such as a capstan, a caterpuller, rollers, etc., may be used to hold the stranded buffer tubes 214 together and in contact with the strength member 212 while the binder sleeve 222 cools and contracts. In some embodiments, the binder sleeve 222 is primarily formed from a polymer, such as polyethylene, polypropylene, polyamide, or another material. The binder sleeve 222 may be particularly thin, such as less than a fifth the thickness of the jacket 220 on average, such as less than a tenth. For example, in some embodiments, the binder sleeve 222 has an average thickness of 0.5 mm or less, such as 0.25 mm or less, and/or even such as 0.15 mm or less. In some embodiments, the binder sleeve 222 may be subsequently bonded to the jacket 220 during the jacketing process.

The construction and arrangements of the fiber optic cables, as shown in the various exemplary embodiments, are illustrative only. Although only a few embodiments have been described in detail in this disclosure, many modifications are possible (e.g., variations in sizes, dimensions, structures, shapes, and proportions of the various members, values of parameters, mounting arrangements, use of materials, colors, orientations, etc.) without materially departing from the novel teachings and advantages of the subject matter described herein. For example, in some contemplated embodiments cables disclosed herein may include some inventive attributes disclosed herein, such as the binder sleeve 222, but not others, such as unconventionally higher or more uniform excess optical fiber length. Alternatively, the cable of FIG. 1 may too include a binder sleeve 222 around the buffer tubes 114. In contemplated embodiments, the cable 110 may be a mono-tube cable, having only one buffer tube 114, where the optical fibers 118 have excess optical fiber length as disclosed herein. In some embodiments, the cable 110, 210 may include only tensile yarn instead of a rigid strength member 112, 212, or may include both. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive and innovative technology.

What is claimed is:

1. A fiber optic cable, comprising:
   a strength member configured to provide tensile strength as well as anti-buckling strength, wherein the strength member is a rod;
   tubes, each tube having a cavity, wherein the strength member provides reinforcement to the tubes, wherein the rod is a central strength member and wherein the tubes are wound around the rod in a pattern of reverse-oscillatory winding, wherein the tubes are generally round in cross-section and have an average outer diameter of 3 millimeters or less, wherein the tubes have an average inner diameter of 2 millimeters or less; and
   a binder sleeve, wherein the tubes are bound to the central strength member with the binder sleeve that relatively evenly distributes radially inward force to the tubes; and
   optical fibers packed into the cavity of each tube such that the optical fibers bend therein, having excess optical fiber length providing a strain window such that the optical fibers experience less than 0.5 dB/km of increased average attenuation at 1310 nanometers wavelength when the cable experiences strain of up to 1% compared to when unstrained.

2. The cable of claim 1, wherein the tubes each contain at least twelve optical fibers, the optical fibers comprising a glass core, a glass cladding, and a polymeric coating, and wherein the optical fibers have an outer diameter of at least 200 micrometers.

3. The cable of claim 1, wherein the binder sleeve is formed from an extruded polymer material that is continuous lengthwise along a 10 meter long section of the cable and continuous peripherally around the tubes to form a closed loop.

4. The cable of claim 3, further comprising a jacket extruded around the binder sleeve, wherein the binder sleeve has an average thickness that is less than a fifth that of the jacket.

5. The cable of claim 4, wherein the binder sleeve is bonded to the jacket.

6. A fiber optic cable, comprising:
   a strength member configured to provide tensile strength as well as anti-buckling strength, wherein the strength member is a rod;
   tubes formed from polymer, each tube having a cavity, wherein the strength member provides reinforcement to the tubes, wherein the rod is a central strength member and wherein the tubes are wound around the rod in a pattern of reverse-oscillatory winding, wherein the tubes are generally round in cross-section and have an average outer diameter of 3 millimeters or less, and wherein the tubes have an average inner diameter of 2 millimeters or less;
   a binder sleeve, wherein the tubes are bound to the central strength member with the binder sleeve; and
   optical fibers packed into the cavity of each tube such that the optical fibers bend therein, wherein the optical fibers have a greater length than the length of the respective tube in which the optical fibers are packed, thereby providing a strain window for the cable and correspondingly increasing the stretch-ability of the cable.

7. The cable of claim 6, wherein the tubes each contain at least twelve optical fibers, the optical fibers comprising a glass core, a glass cladding, and a polymeric coating, and wherein the optical fibers have an outer diameter of at least 200 micrometers.

8. The cable of claim 6, wherein the average distance between reversals in the pattern of reverse-oscillatory winding is at least 10 centimeters along the length of the cable and is less than 5 meters along the length of the cable, whereby the tubes have stored torsion motivating separation between the tubes and the central strength member, which the binder sleeve mitigates by providing a relatively uniform distributed load along the tubes to hold the tubes to the central strength member.

9. The cable of claim 6, wherein the binder sleeve is primarily formed from a polymer.

10. The cable of claim 9, wherein the binder sleeve is continuous lengthwise and peripherally around the tubes, forming a closed loop for a length of at least 10 meters along the cable, thereby limiting localized stressing of the tubes.

11. The cable of claim 9, further comprising a jacket formed from a polymer that defines the outermost surface of the cable, wherein the binder sleeve is bonded to the jacket.

12. The cable of claim 11, wherein the binder sleeve comprises polyethylene and the jacket comprises polyethylene.

13. The cable of claim 11, wherein the binder sleeve has an average thickness of 0.5 millimeters or less, which is less than a fifth the thickness of the jacket on average.

14. A fiber optic cable, comprising:
   a strength member configured to provide tensile strength as well as anti-buckling strength, wherein the strength member is a rod;
   tubes formed from polymer, each tube having a cavity, wherein the strength member provides reinforcement to the tubes, wherein the rod is a central strength member and wherein the tubes are wound around the rod in a pattern of reverse-oscillatory winding, wherein the tubes are generally round in cross-section and have an average outer diameter of 3 millimeters or less, and wherein the tubes have an average inner diameter of 2 millimeters or less; and
   a binder sleeve, wherein the tubes are bound to the central strength member with the binder sleeve, wherein the binder sleeve is primarily formed from a polymer, wherein the binder sleeve is continuous lengthwise and peripherally around the tubes, forming a closed loop for a length of at least 10 meters along the cable, thereby limiting localized stressing of the tubes;
   optical fibers packed into the cavity of each tube such that the optical fibers bend therein, the optical fibers comprising a glass core, a glass cladding, and a polymeric coating including a softer, stress-isolation layer immediately surrounded by a harder shell;
   wherein the optical fibers are relatively highly packed into the tubes such that the average length of the optical fibers for a 10 meter long section of the cable is at least 25 millimeters greater than the average length of the tubes in that section,
   wherein the optical fibers are relatively evenly packed into the tubes, all the optical fibers having almost the exact same length such that for the 10 meter long section of the cable the optical fibers individually differ from the average length of the optical fibers of that section by less than 5 millimeters,
   whereby the optical fibers experience less than 0.5 dB/km of increased average attenuation at 1310 nanometers wavelength when the cable experiences strain of up to 1% compared to when unstrained.

15. The cable of claim 14, further comprising a jacket formed from a polymer that defines the outermost surface of the cable, wherein the binder sleeve is bonded to the jacket.

16. The cable of claim 15, wherein the binder sleeve comprises polyethylene and the jacket comprises polyethylene.

17. The cable of claim 15, wherein the binder sleeve has an average thickness of 0.5 millimeters or less, which is less than a fifth the thickness of the jacket on average.

18. The cable of claim 14, wherein the average distance between reversals in the pattern of reverse-oscillatory winding is at least 10 centimeters along the length of the cable and is less than 5 meters along the length of the cable, whereby the tubes have stored torsion motivating separation between the tubes and the central strength member, which the binder sleeve mitigates by providing a relatively uniform distributed load along the tubes to hold the tubes to the central strength member.

* * * * *